United States Patent [19]

McChesney et al.

[11] Patent Number: 5,857,102

[45] Date of Patent: Jan. 5, 1999

[54] SYSTEM AND METHOD FOR DETERMINING AND MANIPULATING CONFIGURATION INFORMATION OF SERVERS IN A DISTRIBUTED OBJECT ENVIRONMENT

[75] Inventors: Roderick J. McChesney, Redwood City; Gregory B. Nuyens, Menlo Park, both of Calif.

[73] Assignee: Sun Microsystems, Inc., Mt. View, Calif.

[21] Appl. No.: 403,337

[22] Filed: Mar. 14, 1995

[51] Int. Cl.[6] ............................................ G06F 9/445
[52] U.S. Cl. ................................................. 395/653
[58] Field of Search ............................ 395/700, 300.1, 395/651, 652, 653, 712

[56] References Cited

U.S. PATENT DOCUMENTS

| | | | |
|---|---|---|---|
| 5,230,052 | 7/1993 | Dayan et al. | 395/700 |
| 5,249,290 | 9/1993 | Heizer | 395/700 |
| 5,257,378 | 10/1993 | Sideserf et al. | 395/652 |
| 5,317,744 | 5/1994 | Harwell et al. | 395/700 |
| 5,361,360 | 11/1994 | Ishigami et al. | 395/700 |
| 5,367,635 | 11/1994 | Bauer et al. | 395/653 |
| 5,379,430 | 1/1995 | Nguyen | 395/700 |
| 5,379,431 | 1/1995 | Lemon et al. | 395/700 |
| 5,404,527 | 4/1995 | Irwin et al. | 395/700 |
| 5,428,785 | 6/1995 | Morel et al. | 395/651 |
| 5,469,573 | 11/1995 | McGill, III et al. | 395/712 |

OTHER PUBLICATIONS

Object Management Group, 'The Common Object Request Broker: Architecture and Specification,' Rev 1.2 OMG TC Document No. 93–12–43, Dec. 29, 1993.

*Primary Examiner*—Emanuel Todd Voeltz
*Assistant Examiner*—Peter J. Corcoran, III
*Attorney, Agent, or Firm*—Fenwick & West LLP

[57] ABSTRACT

A computer system in a distributed object programming environment includes a number of host computers providing services to clients on a network through internally stored servers. Various types of configuration information for each server are available to clients through persistent server administrators, which are objects containing such information about individual servers. A server administrator can store such information as startup execution definitions, saved program definition, object interfaces and implementations, reaping, tracing, and logging configuration data. Being persistent and external to the server, the server administrator can manipulate and determine its information about a server in response to client requests without starting up the server, thereby facilitating system administration.

33 Claims, 8 Drawing Sheets

Servers

Server Viewer — 701

Filter by Computer Name: bagua — 717
Filter by Server Name: — 719

| Computer | Server | Implementation | Process ID |
|---|---|---|---|
| bagua | SalesOrder_server | SalesOrderFactImpl | -inactive- |
| bagua | SalesOrder_server | SalesOrderImpl | -inactive- |
| bagua | SalesOrder_server | ServerSpyImpl | -inactive- |
| bagua | Warehouse_server | WarehouseFactImpl | 5464 |
| bagua | Warehouse_server | WarehouseImpl | 5464 |
| bagua | Warehouse_server | ServerSpyImpl | 5464 |
| bagua | Product_server | ProductFactImpl | -inactive- |
| bagua | Product_server | ProductImpl | -inactive- |
| bagua | Product_server | ServerSpyImpl | -inactive- |
| bagua | Customer_server | CustomerFactImpl | 5463 |
| bagua | Customer_server | CustomerImpl | 5463 |
| bagua | Customer_server | ServerSpyImpl | 5463 |
| bagua | PropertySet_server | PropertySetFactImpl | -inactive- |
| bagua | PropertySet_server | PropertySetImpl | -inactive- |
| bagua | PropertySet_server | PropertySetIteratorImpl | -inactive- |
| bagua | PropertySet_server | ServerSpyImpl | -inactive- |

*FIGURE 7*

SYSTEM AND METHOD FOR DETERMINING AND MANIPULATING CONFIGURATION INFORMATION OF SERVERS IN A DISTRIBUTED OBJECT ENVIRONMENT

BACKGROUND

1. Field of Invention

This invention relates to the field of object oriented application and operating systems development, and more particularly, to methods and systems for performing administrative operations on object oriented applications operating in a distributed object programming environment.

2. Background of Invention

Client-server computing is the predominant model for the management of computing resources, typically on a network of distributed computers. Servers are computers and application programs executing thereon that provide various functional operations and data, upon request. Clients are computers and applications that request such services. While clients and servers may be distributed in various computers on a network, they may also reside in a single computer, with individual applications providing client or server functions, or both.

In a client-server system based on a object oriented development environment, a client is code that invokes or manipulates an object, and the object that is invoked is the server. A server provides a number of interfaces to clients for invoking various objects within the server that provide functionality requested by a client. Each of the objects may have multiple implementations, or object code that executes the functionality of the code when an instance of the object is created by the server. Thus, a particular interface, when used by a client to invoke an object, will result in the execution of a particular implementation for the object that is invoked. When the server or one of its objects is invoked, the server will operate in accordance with certain configuration information, such as the location of its data directory, the executable pathname, and the like. In a client-server system, it is desirable to be able to determine and manipulate the configuration information for a server available on the network without consuming system resources by invoking the server.

Information about a server can be classified into two categories. Dynamic information arises out of a particular process that is executing a server, such as its process identifier, how many objects are active within the server, and the like. This information is dynamic because it depends on a current executing process which is transient. Static information is information that does not devolve from a particular execution or process. This includes external information such as the identify of the host computer of where the server is installed, its pathname, its execution definition, and internal information, such as the identity and description of the object interfaces and implementations the server provides, and the setup of various application programming interfaces used by the server, such as the identity and configuration of tracing facilities available in the server, log file configurations, and reaping functions.

Conventionally, systems administrators have various software tools for determining the configuration and related information about servers on various computers on a network. However, these administrative tools require that the server be executing as a process for any information to be obtained, and thus require an inactive server to be started up, merely to obtain or manipulate configuration and similar information. Such startup procedures limit the flexibility of the administrative tools, and require unnecessary consumption of computer resources. This is particularly the case where a client needs to determine configuration information for a large number of servers on the network.

Similarly, network managers use network management tools to determine the state of network resources, such as routers, bridges, printers, file servers, disk drives, workstations and the like. With conventional network management tools, such as tools compliant with the SNMP or CMIP standards, individual managed objects are associated with each network device. The network manager can query and configure networked devices through manipulation of the managed object associated with each device. These managed objects however, are limited to conveying information at the device level, and do not query or manipulate object level information for individual processes, particularly for servers running on workstations and similar processing units. For example, SNMP tools currently do not determine the interfaces implemented by a given server on a particular workstation. Thus, these tools do not provide adequate level of granularity for use by a systems administrator of a client-server system built on a distributed object programming environment.

Additionally, SNMP and CMIP tools require the network device associated with each managed object to be operating and available on the network in order for the managed object to determine and configure the state of the network device. Conventional managed objects are unable to automatically startup their associated network devices, and thus if the network device crashes or its otherwise terminated, the managed object and the SNMP tool is unable to provide information about the network device. This is because the managed objects do not have information about the startup configuration of the network devices, as the managed objects operate on the assumption that the associated network devices are already operating. Thus, these tools would also require the servers to be executing in order for any information to be obtained. Similarly, with low level protocols, like RPC, no information is stored about pathnames, configuration information or the like for servers, again, preventing an RPC agent from starting a networked server, or providing process level information.

In conventional systems where the processes created by an application all reside in a common address space, typical system administrative tools require providing an explicit reference to the host machine and the process or processes for which information is requested. In a distributed object programming environment, however, a client invokes a server through an object reference, without having information as to where the invoked object resides in the system, that is, without specifically knowing the computer where the invoked object is stored or where its running. Rather, the client passes the object reference through an object request broker which locates the server, and passes back any output from the server to the client. To the user, the client and server, and any group of distributed objects, behave transparently as an integrated application, even though the objects may be distributed in various computer systems. One standard for the distributed object programming is the *Common Object Request Broker Architecture* (CORBA), specified by the Object Management Group. In this environment, conventional system administrative tools are shielded from the actual implementation of the server, and do not have a mechanism for obtaining unified access to the internal structure of a server, particuarly its configuration setup. While such information may be available in various objects in various parts of the environment, such as naming services, and the like, there is no unified object that provides this information access efficiently.

Accordingly, it is desirable to provide a method and system for obtaining and manipulating configuration information about servers on computers in a distributed object programming environment without starting up the servers, and where only an object reference to the server is available to clients.

SUMMARY OF THE INVENTION

The present invention overcomes the foregoing limitations by associating with each server a persistent stored object known as a server administrator. The server administrator stores various types of information that can be known about the server without starting up the server, such as its execution definition, name, location, and various internal configuration information, such as the object interfaces and implementations supported by the server. Because the server administrator is persistent, it maintains the configuration information even when the server is not executing. This allows the configuration information to be manipulated by clients via the server administrator, which also provides various methods for changing and updating the configuration information.

The presence of a server administrator simplifies the discovery of what services the server provides through the object interfaces and implementations. In the absence of this information stored in the server administrator, clients would have to start up the server to obtain this information. This process can be extremely time and resource intensive, particularly where a client is attempting to determine this information for every server on the network. Storing interface and implementation information in an object, such as the server administrator, external to the server, means that this information can be obtained without starting up the server.

The server administrator also provides for unified storage of startup configuration for the server, allowing a client to obtain and manipulate the startup configuration for many different servers by accessing their respective server administrators which may be stored in a common naming context.

BRIEF DESCRIPTION OF THE DRAWINGS

FIG. 7 is an illustration of one embodiment of a user interface for obtaining information about servers and host machines.

DETAILED DESCRIPTION OF THE PREFERRED EMBODIMENT

Figure 1:
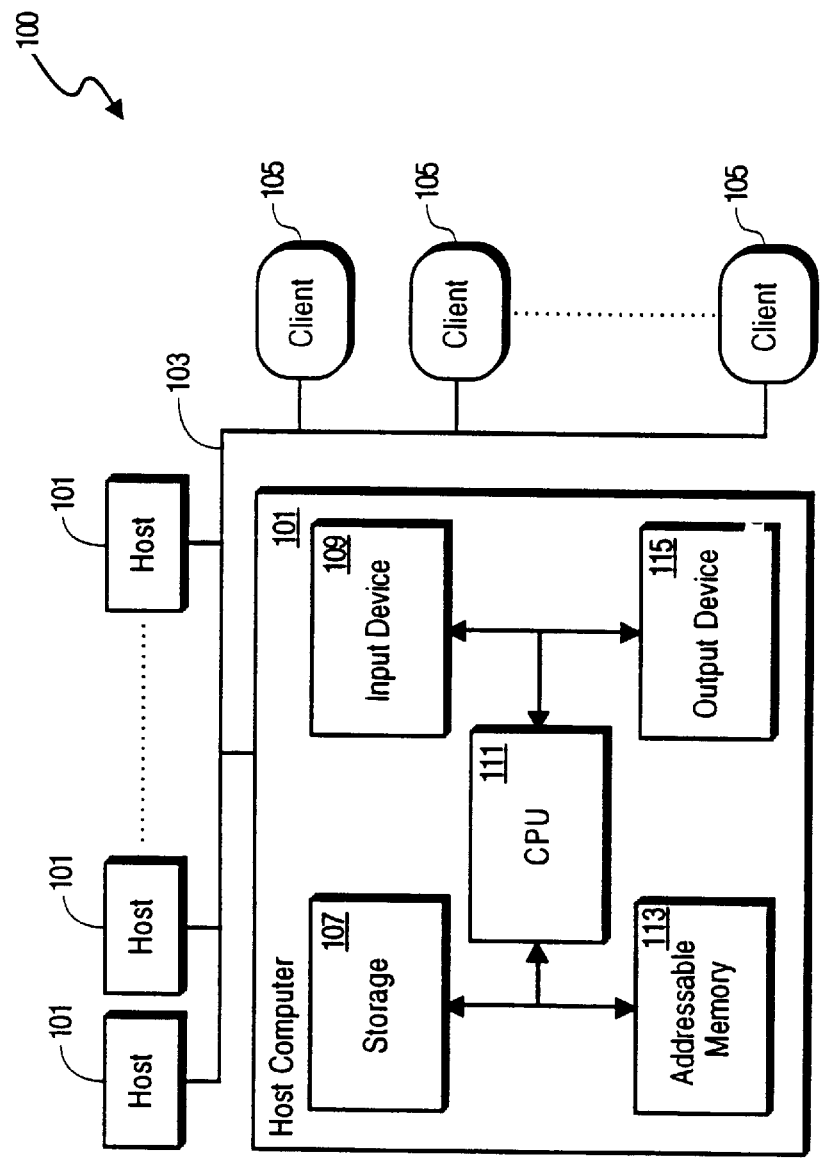
FIG. 1 is an illustration of a system of distributed computers for using server administrator objects.

Referring now to FIG. 1 there is shown a hardware view of a system 100 for determining and manipulating configuration information for servers on distributed computers in a distributed object programming environment. The system 100 includes a number of host computers 101 connected along a network 103. Each host computer 101 includes secondary storage 107 for long term storage of implementation code and data for servers and clients, and the like, an input device 109 and an output device 115 for receiving and outputting commands and data into the system 100, and an addressable memory 113 for storing server and client implementation code during execution by a processor 111. During execution by the processor 111, servers exist as processes in the addressable memory 113. Also coupled to the network 103 are a number of clients 105. Each client 105 is an object executing as a process in a remotely situated computer similar in structure to a host computer 101, or alternatively, existing as separate processes in any of the host computers 101. Each client 105 requests services or data from servers (not shown) in host computers 101 on the network 103. The host computers 101 may be realized by most general purposes computers, such as a SPARCstation™ computer manufactured by Sun Microsystems, Inc. of Mountain View, Calif. Any other general purpose computer may also be adapted for use with the invention. Each host computer 101 executes a general purpose operating system, such as Sun Microsystems' Solaris® operating system. In addition, each host computer 101 is part of an object request broker environment, satisfying the CORBA standards set by the Object Management Group in *The Common Object Request Broker: Architecture and Specification*, Rev. 1.2, OMG TC Document Number 93-12-43, available by anonymous ftp to omg.org. Other equivalent environments for distributed object systems may also be used. In the preferred embodiment, the object request broker environment is Sun Microsystems' Project DOE (Distributed Objects Everywhere).

Figure 2:
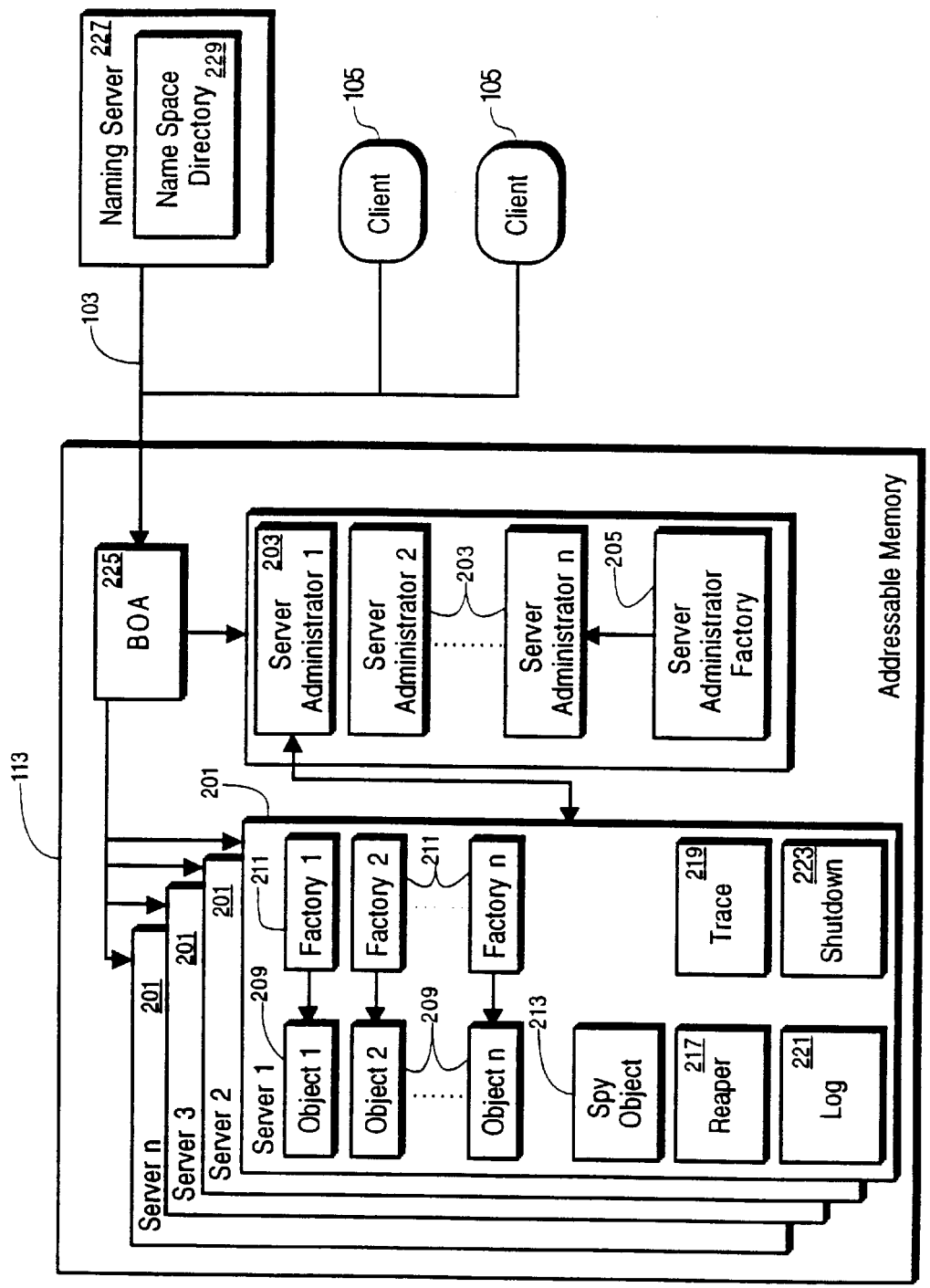
FIG. 2 is an illustration of the organization of a host computer supporting various servers.

Referring now to FIG. 2, there is shown a logical view of system 100, particularly illustrating the configuration of addressable memory 113 in any of the host computers 101 during runtime operation of various servers. The addressable memory 113 of each host computer 101 includes a number of executable objects for performing various functions, including user application functions, such as word processing, database management, graphics design, CAD engineering, software development, financial management, and the like, and operating system functions, such as memory management, resource allocation, storage management, and system accounting information, and network interfacing with remote clients and hosts.

More particularly, host computer 101 includes a number of servers 201, each providing a particular type of functionality to clients 105 distributed on the network 103 (or locally executing in the host computer 101). Each server 201 in the host computer 101 includes a number of objects 209, each of which encapsulates data associated with the object 209 and its state, and executable code for implementing functional operations, or methods of the object 209 on the data or other objects 209. An object 209 is manipulated by clients 105 or other objects 209 through an interface definition that specifies the operations, attributes, and exceptions that an object 209 provides. The objects 209 are distributed objects, distinguished from conventional objects in object oriented programming languages in that the interface of an object 209 is defined in an interface definition language, which is then mapped to an implementation language, such as C++ or C. This allows objects 209 to have multiple implementations in various languages, while still maintaining a consistently defined interface. A client 105 does not have to have any information about the underlying implementation of the object 209, but merely has to have the interface for the object 209. The objects 209 are distributed in that a client 105 may invoke an object 209 existing anywhere on the network 103, including in the address space of a client 105, or any number of host computers 101, by using a naming server 227 and the various BOAs 225 on the host computers 101.

Facilitating communication the clients 105 and the host computers 101 is a basic object adapter 225, or BOA. The BOA 225 comforms to the requirements for the basic object adapter specified in CORBA. The BOA 225 provides an interface for clients 105 to access object implementations of objects 209 included in servers 201 on various host computers 101 distributed on network 103. Object implementations are actual code which implements an object 209. In order to efficiently manage the addressable memory 113 of the host computer 101, the BOA 225 maintains records indicating which servers 201 are active and inactive, and in each server 201, which objects 209 are active or inactive, and which implementations of object methods are also active or inactive. In this way the BOA 225 can readily manage memory resources in the addressable memory 113 on an as-needed basis, allocating memory to active servers 201, objects 209 and implementations, and deallocating memory from inactive entities. The BOA 225 includes a daemon for managing and responding to invocations from clients 105 for objects 209 in the various servers 201 of the host computer 101. The daemon of the BOA 225 automatically starts up a server 201 in the host computer 101 to service an incoming call to an object 209 if the server 201 is not running. The BOA 225 receives a request from a client 105 for an object 209 in a server 201, the client 105 passing the object reference to the BOA 225. The BOA 225 determines whether there is an active implementation of the object 209 or method and if so, the BOA 225 passes the request to the object 209, otherwise, the BOA 225 retrieves the implementation code for the object 209 from secondary storage 107, starts a new process for the invoked object, executing the implementation with the processor 111. The BOA 225 will also manage deactivation of objects 209 and implementations that are no longer being used, or that are explicitly terminated by a client 105 or server 201, reclaiming resources allocated to the object 209 and updating any persistent attributes or data of the object 209.

Coupled to the host computer 101 by the network 103 is a naming server 227. The naming server 227 maintains a name space directory 229 including number of naming contexts, each of which includes a set of name bindings. A name binding is an association between an arbitrary object name, and an object reference uniquely identifying an object 209 within a server 201 and further identifying the server 201, and host computer 101 including the object 209. The naming server 227 provides methods for binding a name to an object reference so that the object 209 associated with the object reference can be accessed from the name, and for resolving names provided by clients 105 in order to provide an object reference to a client 105. With an object reference, a client 105 can directly invoke a server 201 or any object 209 within a server 201. The naming server 227 provides clients 105 with a service that allows access to distributed servers 201 before the client 105 has an object reference. Multiple naming servers 227 may be supported, with clients 105 transparently accessing various naming servers 27 on the network 103. In the preferred embodiment, a naming server 227 is included in each host computer 101, and supports objects 209 within the host computer 101; multiple naming servers 227 then work in conjunction to provides clients 105 with object references for local objects 209.

A factory object 211 may be associated with each object 209, for performing a single method that is called by a client 105 to create a new instance of the type of object 209. The factory object 211 is registered in the name space directory 229 of the naming server 227, which is accessed by clients 105 for obtaining object references. Each factory object 211 includes a static create member function that creates a new object 209 of the type specific to the factory object 211, and returns an object reference to the new object 209. An initialize function is provided in created object 209 to perform any needed initialization on the object's state. Typically there is only one instance of a factory object 211 implementation for each object 209 in the server 201. The instance of each factory object 211 is created when the server 201 is installed in the host computer 201 and registered in the naming server 227. An object 209 need not have an associated factory object 211, for example, where the object 209 is not public and available only to the server 201, or where the server 201 is designed to have a single instance of a particular type of object 209.

For each server 201 on the host computer 101 there is a persistent server administrator 203 object that is instantiated from a server administrator class. Each server administrator 203 maintains configuration information for the particular server 201 associated with the server administrator 203, including information that can be known whether or not the server 201 is executing. This allows system administrative tools to determine the state of the server 201 without having to start up the server 201 as a process in the host computer 101. Throughout the remainder of this disclosure, references to "the server" and "the server administrator" refer to one server 201 and its associated server administrator 203, and it is understood that the functionality described for these respective entities applies to each respective server 201 and server administrator 203 in the host computer 101.

Figure 3:
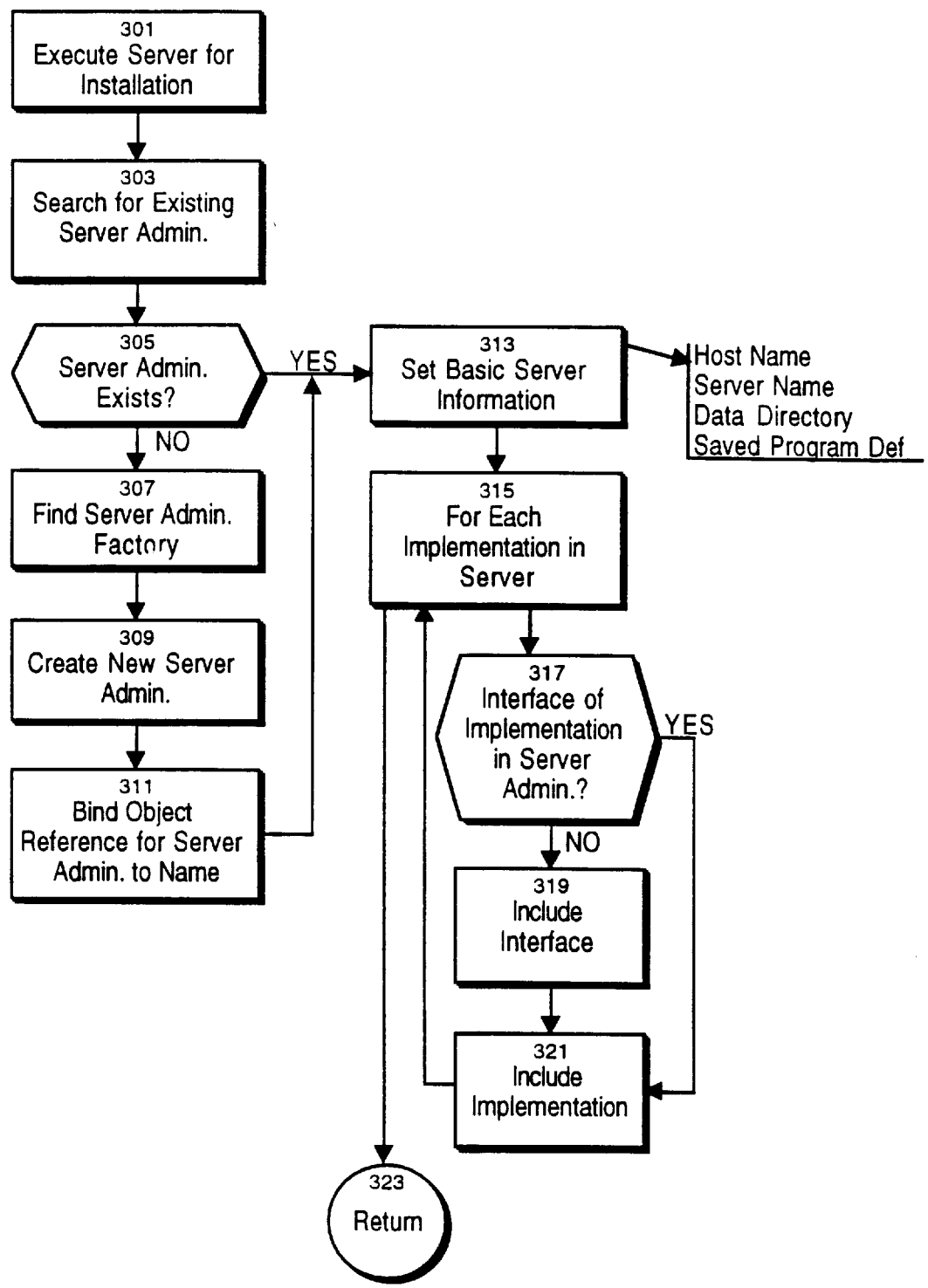
FIG. 3 is a flowchart one embodiment of a process of registering a server with a persistent associated server administrator object.

A server administrator 203 is created by a server administrator factory 205 when a server 201 is installed on the host computer 101. A server 201 is installed using conventional installation techniques, such as executing the server 201 using the name of the server 201 along with a—install command line argument. During this execution, the server 201 will create a new server administrator 203. FIG. 3 shows a flowchart of one method by which a new server administrator 203 is associated with a server 201.

First, the server 201 is executed 301 during the installation process. The server 201 searches 303 for an existing server administrator 203 object by accessing the naming server 227 for the host computer 101, and traversing the name space directory 229. The server 201 determines 305 whether a server administrator 203 object exists with the appropriate name. If no associated server administrator 203 object is located in the host computer 101, the server 201 accesses 307 the server administrator factory 205 via an object reference stored in the naming server 227.

The server 201 will invoke 309 the create method of the server administrator factory 205, instantiating a new server administrator 203 object, and obtaining an object reference for the new server administrator 203. The server 201 will then store 311 a binding of the object reference and an object name for the server administrator 203 in the naming server 227; the object name should uniquely identify the server administrator 203 as associated with the particular server 201. Typically the object name will have the following format:

<host_computer_name>/admin/servers/<server_name> where host_computer_name is the literal string name provided to the host computer 101 including the server 201, and the server_name is specified by the developer of the server 201.

The server 201 will set 313 various execution related configuration information in the appropriate structures of the server administrator 203, as further described below. This information preferably includes the name of the host computer 101 where the server 201 is installed, the name of the server 201 and any aliases for executing multiple instances of the server 201, the path name of any data directory the server 201 uses for storing and accessing local data and resources, and the program definition. The data directory information allows the operating system or other administrative layer to administer the files in the data directory, for example, providing backup services. The data directory is used to issue a change directory command after the server 201 is executed so that the identified directory becomes the current directory. The saved program definition is the pathname, command line arguments, and environmental variables used when the server 201 is started up.

Normally, the program definition is stored in the BOA 225 as a part of the execution definition. In the BOA 225, any change to the program definition is permanent and undoable, and thus previous configurations of the program definition are not saved. However, it is typically necessary to alter the program definition for administrative reasons, for example, to attach a debugger to the server 201 for debugging, or to execute various functions from a shell program. Conventionally, once the program definition in the BOA 225 is made to accommodate these needs, the system administrator would have to manually reconstruct and reset the normal or original program definition. With the saved program definition stored in the server administrator 203 this information can be preserved and recalled separately from the BOA 225. The saved program definition thus allows the server administrator 203 to restore the correct program definition after the BOA 225 has been changed.

Once the basic server information is stored in the server administrator 203, the server 201 will loop 315 over each of the implementations present in the server 201. Each implementation is executable code that implements an interface for methods or attributes of an object 209 included in the server 201. The server 201 tests 317 whether the interface of the implementation is already stored in the server administrator 203, and if not, the server 201 stores 319 to the server administrator 203 information to identify the interface. This information preferably includes an identification of the interface, such as the name of the interface and an identification value. This information allows the server administrator 203 to provide to clients 105 information as to which objects 209 the server. 201 supports. The server 201 then stores 321 in the server administrator 203 information about the implementation, preferably storing the name of the implementation, and an identification value of the implementation that is unique on the host computer 101, and the interface associated with the interface. This allows the server administrator 203 to invoke the implementation at a later time in response to a request from a client 105, thereby starting up the server 201 if necessary.

The purpose of this loop is to identify to the server administrator 203 which object interfaces the server 201 implements, so that the server administrator 203 can provide this information to client 105 at a later time without having to start up the server 201 if it is not running at the time the client 105 requests the information. In addition, this internal information, which is otherwise not directly available to clients 105 because of the location opacity of the distributed object programming environment, allows clients 105, acting on behalf of system administrators or others, to determine which servers 201 are capable for performing which functions.

Figure 4A:
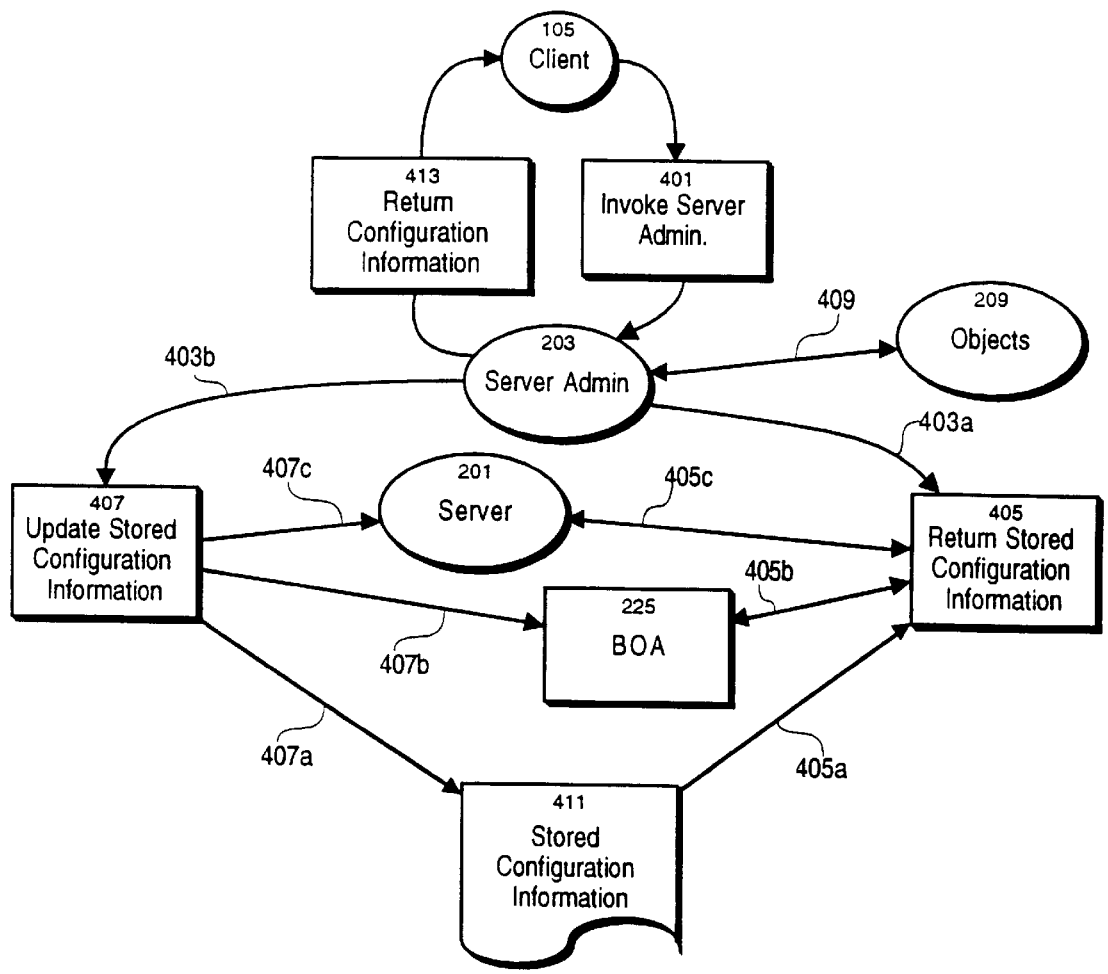
FIGS. 4a and 4b are data flow diagrams of the call architecture for obtaining information about a server without starting up the server.

The server administrator 203 provides clients 105 with a unified means for accessing and manipulating configuration information about the server 201 with which it is associated. FIG. 4a illustrates a dataflow diagram of the basic architecture of obtaining and manipulating configuration information. Generally, the server administrator 203 receives 401 a request from a client 105, through an invocation of one of its operations or attributes, for selected configuration information about the server 201. The server administrator 203 will execute 403(a,b) the appropriate method, as requested by the client 105 to manipulate the information. The server administrator 203 may then return 413 the information to the client 105 if requested.

More particularly, the server administrator 203 may invoke 403a a method to return 405 the requested configuration information from various sources. These include returning 405a the configuration information by accessing stored structures 411 in the server administrator 203 that persistently maintain the configuration information; by accessing 405b configuration information stored in the BOA 225; and by accessing 405c the server 201 itself.

The server adminstrator 203 may also execute 403b methods to update 407 configuration information using values or data supplied by the client 105. These methods including updating 407a the stored configuration information 411; updating 407b persistently stored configuration information in the BOA 225 or similar services; and updating 407c stored configuration information in the server 201.

In some instances, the server administrator 203 may also invoke 409 other objects 209 or services in the distributed object environment to obtain the requested configuration information.

Where the server administrator 203 accesses the stored configuration information 411, the BOA 225, or other object 209, it performs its functionality without invoking the server 201 if the server 201 is not already executing as a process in the host computer 101. This conserves system resources, provides faster response time to client 105 requests, and simplifies administration of the system 100.

Referring generally to FIG. 2, for those methods that obtain dynamic configuration information, such as the process identifier of the server 201, there is preferably an object 209 within the server 201 that can observe and report the current state of the server 201. Because the server administrator 203 is not within the server 201 with which it associated, it must call an object 209 that is. In order to ensure that the server administrator 203 always has access to the same object 209 in a server 201 regardless of how the applications developer created the server 201, there is preferably embedded in each server 201 a server spy 213 object. The server spy 213 object is more completely described in the related application identified above. The server spy 213 is known by the server administrator to always be present, and accordingly, the server administrator 203 calls the server spy 213 to obtain dynamic configuration information about the server 201 containing the server spy 213. The server spy 213, as with all objects 209, inherits from a base class, CORBA::Object, that provides several fundamental functions. One of these is the_implementation method. This method returns a CORBA pseudo object specific to a CORBA defined implementation class. This class provides further basic functionality, particularly, methods that return information about the process in which the originating object, here the server spy 213, is embedded. This information is passed back to the server administrator 203 as necessary to provide the desired information to a requesting client 105.

Figure 4B:
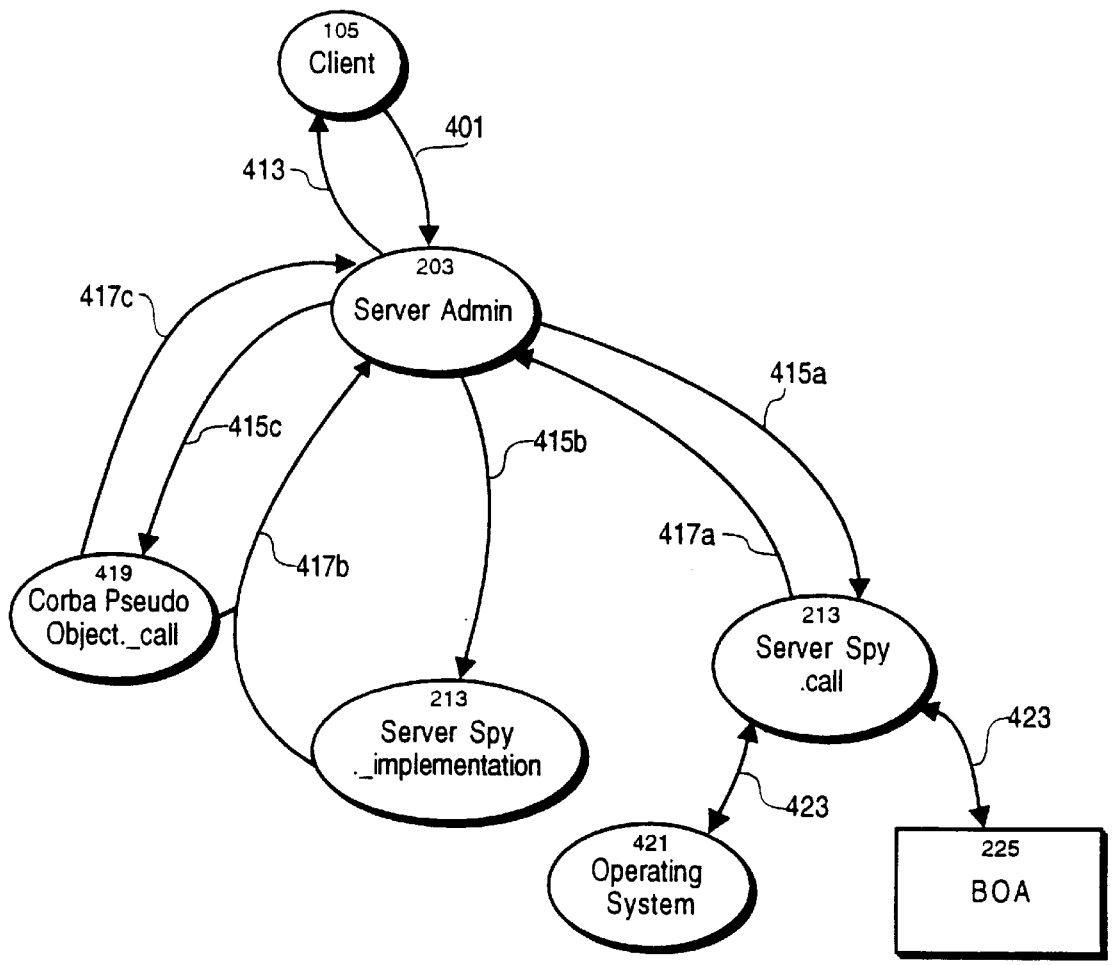

FIG. 4b illustrates the general architecture of this interaction between the server administrator 203 and the server spy 213. First, a client 105 will invoke 401 a method of server administrator 203 to provide some specific information about the current state of dynamic configuration information of the server 201. The server administrator 203 will invoke 415a the server spy 213 to obtain the information. In some cases, the server spy 213 has the necessary method to obtain the information, and so executes and returns 417a this information to the server administrator 203. In other cases, where the server spy 213 does not include an appropriate method itself, server administrator 203 will then invoke 415b the_implementation method of the server spy 213. The_implementation method is inherited from the CORBA::Object class, and returns 417b an object reference to a CORBA pseudo object 419. This CORBA pseudo object 419 has all the functionality defined by the CORBA standard for the object base class. The server administrator 203 will then invoke 415c an appropriate function call on the CORBA pseudo object 419 to obtain the requested information about the server 201. The CORBA pseudo object 419 will return 417c this information to the server administrator 203, which may store it 407 or pass it 413 on to the client 105 if desired. In other cases, the server administrator 203 will invoke 415a a particular method of the server spy 213, which will in turn invoke or access 423 a lower level object or process, such as the operating system 421 or the BOA 225 to obtain the requested information.

This architecture has been shown with respect to the preferred embodiment using the server spy 213. The server spy 213 is the preferred object 209 for this process because it is embedded in every server 201 created in the distributed object programming environment, and thus, the server administrator 203 can reliably invoke the server spy 213 in the server 201. Alternatively, any object 209 in the server 201 can be employed in the same capacity as the server spy 213, so long as that object 209 inherits from the CORBA::Object class. To do this, the server administrator 203 would have to identify the objects 209 in the server 201, in a manner similar to that described with respect to FIG. 3. The server administrator 203 could then select one of the identified objects 209 as its agent for performing these various methods as required.

The specific methods or attributes provided in the preferred embodiment of the server administrator 203 for determining various types of configuration information of the server 201 are as follows, and are one implementation of the interface definition included in Appendix A. Appendix A is a pseudo interface definition language (IDL) file illustrating one embodiment of the interface of the server administrator 203; the following discussion is with respect to the functionality of a server administrator 203 described above, as provided by the interface disclosed in Appendix A. It is understood that other interface definition files may also be suitably used to define a server administrator 203 object. Similarly, various implementation files can be used to implement the attributes of the server administrator 203 (further described below) as shown in IDL file.

The server administrator 203 includes an attribute for determining whether the server 201 is currently executing as a process in the processor 111 of the host computer 101. An example of the interface for this attribute is the is_running attribute of the IDL. This boolean attribute indicates whether the server 201 associated with the particular server administrator 203 is currently executing as a process by the processor 111 of the host computer 101. When this attribute is invoked, the server administrator 203 calls 415b the_ implementation method of the server spy 213, as illustrated in FIG. 4b, which returns 417b an object reference to a CORBA pseudo object 419.

The server administrator 203 then invokes 415c an is_server_running method on the CORBA pseudo object 419, which is provided as part of the implementation object class for CORBA. This method operates by determining whether the implementation that includes the CORBA pseudo object 419 is currently executing. The CORBA pseudo object 419 will return 417c a boolean TRUE if the server 201 is running, otherwise, it returns 417c a boolean FALSE. With this method, the server administrator 203 is able to determine, on behalf of a request from a client 105, whether a server 201 is actually running without starting up the server 201 since a call to the CORBA pseudo object 419 may be completed without starting up the server 201, as with a normal distributed object 209.

The server administrator 203 further includes an attribute for determining the process identifier of the server 201. An example of the interface for this attribute is the process_id attribute of the IDL. This attribute is implemented by method similar to the is_running attribute. Here, after obtaining 417b the object reference to the CORBA pseudo object 419, the server administrator 203 will invoke 415c a process_id method on the CORBA pseudo object 419. This method returns 417c the process identifier for the process, here the server 201 process, that contains the CORBA pseudo object 419. If the server 201 is not running as a process, the CORBA pseudo object 419 will return zero. Again, this method allows the server administrator 203 to provide internal state information, here the process id, of a server 201 to a client 105 without starting up the server 201.

The server administrator 203 further includes an attribute which will suppress the server 201 from starting up to service invocations of object 209 within the server 201. An example of the interface for this attribute is the hold_down attribute of the IDL. As noted, the daemon of the BOA 225 automatically starts up an inactive server 201 in the host computer 101 to service an incoming call to an object 209. However, it is sometimes desirable to suppress the server 201, for example, to upgrade, or backup the server 201. In these instances, the system administrator or other user does not want the daemon to start up the server 201 in response to calls from clients 105. Accordingly, the daemon will always check a hold_down value set in the execution definition of the server 201, as stored in the BOA 225. The hold_down attribute (in both the server administrator 203 and in the BOA 225) is preferably a multivalued enumerated type, providing for various types of hold_down responses. The hold_down attribute may have a "LONG" value, which indicates to the daemon that the server 201 will be down for an extended period time. In this case, the daemon can throw an appropriate exception back to the invoking client 105. The hold_down attribute may have a "SHORT" value, indicating the the server 201 will be down only temporarily, such as several seconds, in which instance the daemon will wait until the server 201 is available again, and then service the client 105 by starting up the server 201. Finally, the hold_down attribute may take a "NONE" value, indicating that the server 201 is not held down, and immediately available for execution. The server administrator 203 sets the hold_down attribute by finding the execution definition for the server 201 in the BOA 225, obtaining the program definition included in the execution definition, and setting the hold_down value in this definition.

The server administrator 203 further includes an attribute that stores a master version of the program definition in the BOA 225. An example of the interface for this attribute is the boa_program_def attribute of the IDL. This program definition includes the pathname, command line arguments, and the environment to be used when the server 201 is started up by the BOA 225. This attribute of server administrator 203 allows a client 105 to change the program definition at any time, again, without having to start up the server 201 merely for this purposes, and without having to directly interface with the BOA 225. This is down by invoking the boa_program_def attribute and passing in the desired parameters. Once changed, the new program definition will be used by the BOA 225 the next time the server 201 is invoked. When this attribute is invoked without parameters, the server administrator 203 will return the current program definition.

The server administrator 203 further includes an attribute that stores a backup version of the program definition in BOA 225. An example of the interface for this attribute is the saved_program_def attribute of the IDL. As described above, the BOA 225 only maintains a single current program definition, which may be changed only temporarily for administrative purposes. The saved program definition allows changes to the program definition to be restored to a previous version; this is particularly useful for temporary changes to the program definition. Invoking this attribute returns the current saved program definition stored in the server administrator 203. The saved program definition is updated manually by the server 201 by passing in the program definition when the server 201 is installed.

The server administrator 203 further includes an attribute that restores the program definition in the BOA 225 with the saved program definition of the server administrator 203. An example of the interface for this attribute is the restore_saved_program attribute of the IDL. When invoked, the server administrator 203 will locate the program definition of the server 201 in the BOA 225, and save to it the values in the saved program definition attribute. This is done by accessing the BOA 225 using an object key provided by an object key method included in all CORBA objects, such as the server spy 213. The object key is then used to extract an object definition, which in turn is used to obtain an implementation definition, and finally, an execution definition, including the program definition. Again, the server administrator 203 is able to alter this configuration information of the server 201, without having to start the server 201.

The server administrator 203 further includes an attribute to allow a system administrator to interpose another application or server for the server 201 that the server administrator 203 manages. Interposing allows the system administrator to have the daemon of the BOA 225 invoke a debugger, shell program, or other administrative tool when the server 201 is invoked by a client 105, by substituting the pathname and argument list of the desired application for the server 201. This is one way in which the program definition of the BOA 225 may be changed, as described above with respect to the boa_program_def and saved_program_def attributes. Using the interpose attribute of the server administrator 203 allows a system administrator to alter the configuration information of the server 201 without starting up the server 201.

Figure 5:
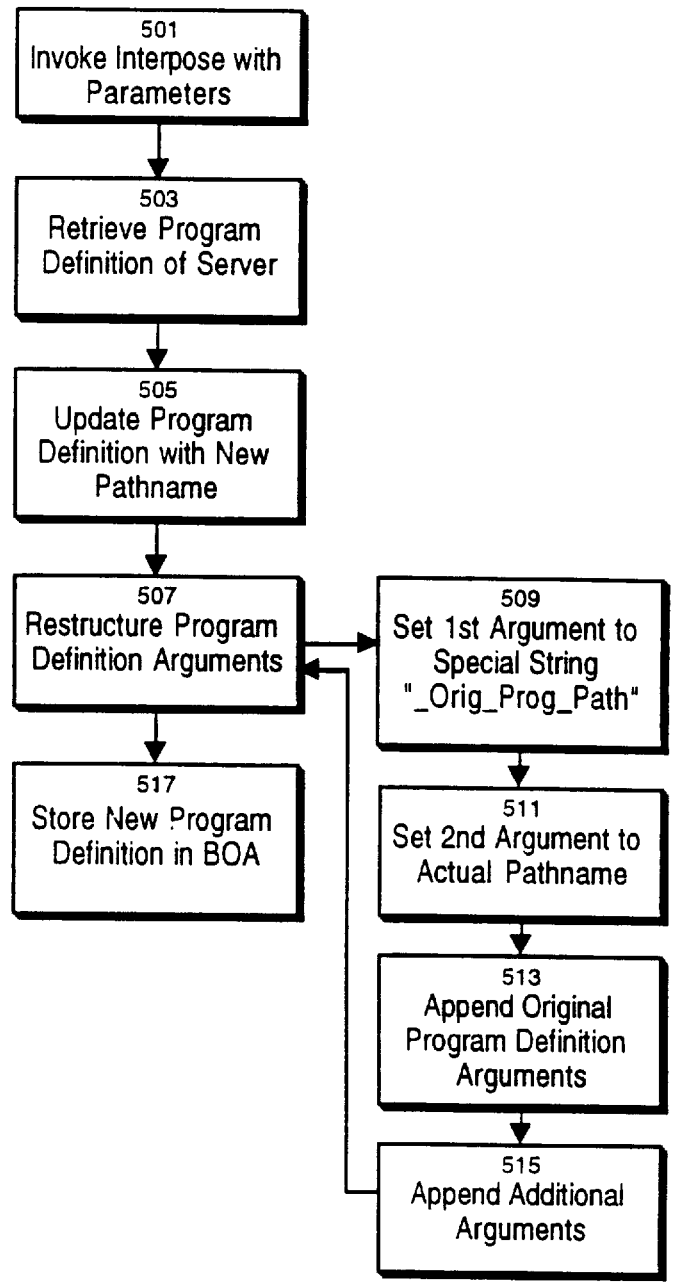
FIG. 5 is a flowchart of one embodiment of a process for interposing an application for the server.

One method for implementing the interpose attribute is shown in the flowchart of FIG. 5. The interpose method is invoked 501 on the server administrator 203, with parameters for the alternate pathname of the interposing application to be executed, and any additional arguments to be passed at the command line. The server administrator 203 obtains 503 the existing program definition of the server 201 from the BOA 225, and changes 505 the pathname stored in the program definition to the pathname of the interposing application. As stated above, the program definition of the server 201 may include a number of arguments to be included when the server 201 invoked. These arguments may not be appropriate to the interposing application. Accordingly, the server administrator 203 will restructure 507 the arguments in the program definition as needed to ensure the correct and useful execution of the interposing application. In the preferred embodiment, this restructuring 507 includes the following: setting 509 the first argument of the program definition argument to a special string that can be easily recognized as the correct executable path of the interposing application, instead of as a regular argument, so that the actual following arguments can be identified; setting 511 the second argument to the actual pathname of the server 201; appending 513 the original arguments of the program definition for the server 201; and finally, appending 515 the additional arguments that were passed into the interpose method for controlling the execution of the interposing application. The server administrator 203 will then store 517 the new program definition in the execution definition of the server 201 in the BOA 225.

The server administrator 203 further includes an attribute for storing and setting the configuration of the reaper 217, for performing automatic deallocation of resources held by idle objects 209. An example of the interface for this attribute is the reaper_config attribute of the IDL. The reaper 217 is preferably configured by three values, a server timeout value, a cycle time value, and a boolean flag. The reaper cycle time determines how often the reaper 217 is activated to perform automatic deallocation. The server timeout value establishes maximum time interval which the server 201 may be idle, that is, during which no object 209 within the server 201 is invoked. If this time interval is equaled or exceeded, then the reaper 217 will automatically shutdown the server 201 the next time the reaper 217 is active. The boolean flag, reaping, tells the reaper 217 whether or not to perform automatic deallocation. The method of the reaper 217 is further shown in the related application identified above. In the preferred embodiment, these various values are stored persistently in the server administrator 203, and when a server 201 is invoked, the reaper 217 included in the server 201 reads the reaper configuration attribute of the server administrator 203 associated with the invoked server 201, and sets its values accordingly.

The server administrator 203 further includes an attribute for storing and setting the configuration of the logging configuration of the server 201. An example of the interface for this attribute is the LoggingConfiguration attribute of the IDL. The logging configuration attribute includes a boolean flag to indicate whether tracing and similar output information is handled by the operating system's system logging daemon; another boolean flag to indicate whether such information is to be output to the console, and a structure identifying a user specified log file for outputting this tracing information, a number of swap log files, and a maximum file size for the log files. The manipulation of log files is further described in the related application referenced above. In the preferred embodiment, these various values are stored persistently in the server administrator 203, and when a server 201 is invoked, the logging API 221 of the server 201 is configured according to the logging configuration of the server administrator 203.

The server administrator 203 further includes an attribute that maintains various internal event driven state variables for the current process of the server 201. An example of the interface for this attribute is the starting( ) method of the IDL file. In the preferred embodiment, these internal state variables are used to monitor whether the server 201 is currently running, thereby allowing the server administrator 203 to report on the current status of the server 201 without starting up the server 201 if it is not already running. These internal state variables include the process identifier for the server 201 process, and a heartbeat interval value indicating how often the server 201 sends a signal, a heartbeat, to its server administrator 203 indicating that it is still active. This heartbeat signal is preferably used instead of the server administrator 203 polling the server 201 to determine whether it is active. The internal state variables further include a value indicating a maximum number of heartbeat signals the server 201 can fail to pass to the server administrator 203 before being presumed to have crashed. Invoking the starting attribute of the server administrator 203 will cause the server 201 to update the attribute values. In the preferred embodiment, the process identifier is provided by the server spy 213, which indirectly invokes a get_pid( ) on the server 201 process.

Each time the server 201 sends a heartbeat signal, the server administrator 203 timestamps the signal. The server administrator 203 periodically, according to the heartbeat interval value, and determines if the server 201 has missed a heartbeat, whereon the server administrator 203 increments a counter. When the counter reaches the maximum value set for missed heartbeats, the server administrator 203 begins a thread to check whether the server 201 has been shutdown or otherwise been terminated.

In conjunction with the starting method, the server administrator 203 also includes a method that is invoked in response to a received heartbeat from the server 201. An example of the interface for this method is the sending_heartbeat( ) method of the IDL file. When the server 201 sends a heartbeat, the server administrator 203 resets a stored timestamp value that tracks the time of the last heartbeat. If the server administrator 203 itself has recently been terminated or shutdown, then it may not have any information as to the identity of the server 201 sending the heartbeat signal; in this case, the server administrator 203 will return a FALSE signal to the server 201, which in turn will invoke the starting( ) method of the server administrator 203. If the server administrator 203 has been active, and does have current information on the identity of the server 201 it is associated with, then it return a TRUE signal to the server 201, indicating that the heartbeat has been successfully received.

Finally, the server administrator 203 also includes an method that is used to indicate that the server 201 has been shut down. An example of the interface of this method is the stopping( ) method of the IDL file. When the server 201 is shutdown through the shutdown method of the server spy 213, the stopping( ) method is invoked. This updates the internal state variables of the server administrator 203 to indicate that the server 201 is no longer active.

The server administrator 203 further includes a number of methods for configuring the tracing facilities included in a server 201. A tracing facility is a set of trace flags that control tracing of selected events, and a set of output values that are output when the various traced events are executed. Tracing facilities and their use are described in further detail in the related application.

A trace configuration is a set of tracing facilities. The server administrator 203 can store a number of tracing configurations that can be used with the server 201 to provide for conditional output of tracing information. When the server 201 is started up, it reads the tracing configuration information in the server administrator 203, and selects a distinguished tracing configuration for initial use; this tracing configuration is named "startup." The server administrator 203 can later change the setup for available tracing configurations, by selecting configurations that provide different sets of trace facilities, or enabling or disabling various trace flags in selected trace facilities. This process does not change the actual facilities in the server 201, but only the settings of the facilities that will be used if and when the facility is later enabled in the server 201. The server spy 213 is used to enable or disable the tracing facilities in the server 201.

More specifically, the server administrator 203 includes various methods for determining and changing tracing configurations. A find method allows a user, such as a system administrator operating through a client 105, to locate a specific tracing configuration by name, enabling the user to determine if such a facility is present in the server administrator 203. If the named configuration is not present, the server administrator 203 returns an appropriate exception.

An add method allows a system administrator to add a new, empty configuration with a specified name to a server 201, to be later completed with specified facilities. When invoked, server administrator 203 will search for the named configuration in its stored sequence of configurations. If the configuration is found, the server administrator 203 will return an exception indicating its existence, otherwise, the server administrator 203 will create a new configuration. A remove method allows a system administrator to remove a named configuration from the stored sequence of configurations.

The server administrator 203 also includes a method for enabling specific trace flags in a trace facility in a configuration. The user passes in a configuration name, a trace facility name, and the desired flags to be enabled. The server administrator 203 will search through its stored sequence of configurations. If the named configuration is found, the server administrator 203 will search through the configuration for the named facility, and if this facility is included in the configuration, the server administrator 203 will enable the desired flags. The server administrator 203 will return appropriate exceptions if either the configuration or facility is not located. Similarly, the server administrator 203 includes a method for disabling specific trace flags in a user identified trace configuration and trace facility. Examples of the interfaces for the add, find, remove, enable and disable methods are shown in the IDL file.

The server spy 213 includes methods for altering the runtime operation of tracing facilities in the server 201. Accordingly, during the life of the server 201 process, the tracing facilities in the server administrator 203 may depart from those operating in the server 201, with new facilities added, or old ones deleted in the server administrator 203. The server administrator 203 thus includes a method for updating the server 201 to include the current set of tracing facilities in the server administrator 203, by deleting from the server 201 tracing facilities that are not currently in the server administrator 203, and by adding facilities that are present in the server administrator 203 but not currently available in the server 201. An example of interface for this method, set_facilities, is shown in the IDL file.

Figure 6:
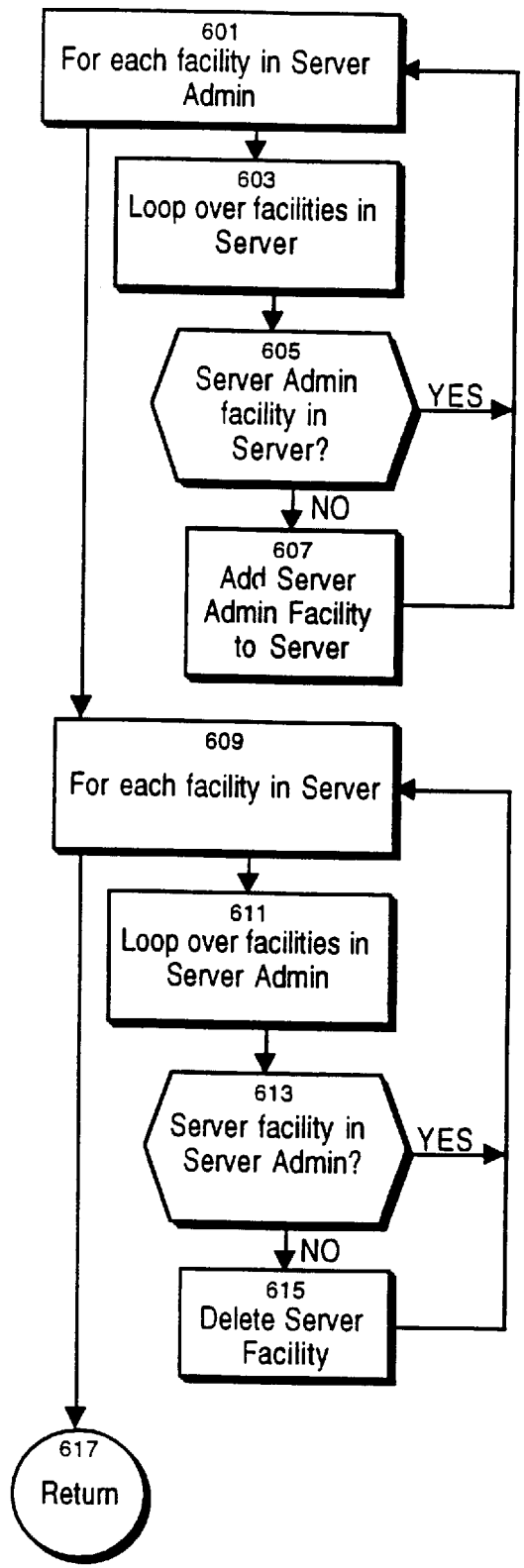
FIG. 6 is a flowchart of one embodiment of a process for updating tracing facilities in the server.

FIG. 6 is a flowchart of one embodiment of the logic of a method for updating the facilities of the server 201. In this embodiment, the method loops 601 over each of the facilities in the server administrator 203, and for each facility, loops 603 over the facilities in the server 201. If none of the facilities in the server 201 match 605 the facility in the server administrator 203, then the facility is added 607 to the server 201. This part of the method updates the server 201 to include any new facilities defined in the server administrator 203. Second, the method loops 609 over each facility in the server 201, and over 611 each facility in the server administrator 203, and determines 613 whether the server 201 facility is present in the server administrator 203. If not, then the facility is no longer required, and it is deleted 615 from the server 201. The method then returns 617. Alternate implementations of the set_facilities method may be employed with variant loop structures or processing steps.

In the preferred embodiment, the set_facilities method is called by the server spy 213 when the server 201 is registered with the BOA 225 to update the facilities in the server 201 with the set of tracing facilities maintained by the server administrator 203. This sets the server 201 to use the most current tracing configuration.

The various methods included in the preferred embodiment of the server administrator 203 provide access and manipulation of detailed configuration about the server 201. Because the server administrator 203 is persistent, the various types of configuration information are maintained beyond a given execution of the server 201. Because the server administrator 203 is external to the server 201, its information can be accessed and manipulated without starting up the server 201. This is beneficial to system administrators and clients 105 for determining the status of many different servers 201 on the network 103 at a time.

For example, FIG. 7 shows one possible embodiment of a user interface for accessing configuration information of the type described herein for servers 201. Here a window 701 provides a column 703 listing the available host computers 101, a column 705 for the available servers 201 on a each host computer 101, a column 707 listing the the object implementations provided by each server 201, and a column 709 for the process identifer of each server 201, if the server 201 is active. For example, the Sales_Order server 711 is available on host computer "bagua," and provides object implementations 713 for a SalesOrderFactImpl object, a SalesOrderImpl object, and a ServerSpyImpl object. As shown in column 709, this server 201 is not currently executing. Other servers are active, such as the Warehouse_ server 715, and the process identifier is the same for all its implementations. The window 701 allows a user, such as a system administrator to filter the listing, using either a host computer name in text entry field 717, or a server name in text entry field 719, or both. As can be seen by the listing, servers 201 can be identified in host computers 101 without starting them up, as indicated by the "inactive" notation for the process identifier.

APPENDIX A

```
// File: ServerAdmin.idl
//
// © 1994 Sun Microsystems, Inc.
// ifndef _SERVER_ADMIN_IDL
define _SERVER_ADMIN_IDL

// #pragma ident "@(#)ServerAdmin.idl 1.18 95/01/16 Sun Microsystems"

#include "ServerSpy.idl"

//
// Each ODF server has a ServerAdmin object associated with it that
// has static information about a server, that is, everything that
// can be known without the server process running.
//
// It also implements the ServerSpy interface, which includes calls to
// inspect and change the state of the running server.
// module DatExt {
    // Interface.  The interface ID is the logical ID used in the interface
    // repository.
    struct Interface {
      string interface_name;
      string interface_id;
    };
    typedef sequence<Interface> Interfaces;

// Implementation of an interface.  The iclass_id is the internal
    // identifier of the implementation, unique on the host.
    struct Implementation {
      Interface implemented_interface;
      string implementation_name;
      BOA::IclassId iclass_id;
      DatInt::Seconds reaper_timeout;
    };
    typedef sequence<Implementation> Implementations;

// An implemented interface.
    struct ImplementedInterface {
      Interface implemented_interface;
      Implementations implementations;
    };
    typedef sequence<ImplementedInterface> ImplementedInterfaces;

// Named tracing configurations.  There is always a configuration named
    // "startup" which is read by the server when it starts.
    // To change the current tracing without saving anything permanently,
    // use the calls inherited from ServerSpy which operate directly on the
    // running server process.
    struct TraceConfig {
      string config_name;      // Config's name
      DatInt::Facilities facilities; // Facilities and their flags
    };
```

```
    typedef sequence<TraceConfig> TraceConfigs;

interface TraceConfigList {
      exception ConfigExists {};
      exception UnknownConfig {};
      exception PredefinedConfig {};   // Trying to remove "startup", etc.

void add(
        in string config_name
    ) raises(ConfigExists);

void remove(
        in string config_name
    ) raises(UnknownConfig, PredefinedConfig);

TraceConfig find(
        in string config_name
    ) raises(UnknownConfig);

void use( // Use this config for current tracing
        in string config_name
    ) raises(UnknownConfig);

void enable_flag(
        in string config_name,
        in string facility_name,
        in string flag
    ) raises(UnknownConfig,
      DatInt::ServerSpy::UnknownFacility,
      DatInt::ServerSpy::UnknownTraceFlag);

void disable_flag(
        in string config_name,
        in string facility_name,
        in string flag
    ) raises(UnknownConfig,
      DatInt::ServerSpy::UnknownFacility,
      DatInt::ServerSpy::UnknownTraceFlag);

boolean flag_is_enabled(
        in string config_name,
        in string facility_name,
        in string flag
    ) raises(UnknownConfig,
      DatInt::ServerSpy::UnknownFacility,
      DatInt::ServerSpy::UnknownTraceFlag);

readonly attribute TraceConfigs trace_configs;

// These two are for internal use only.
    void set_facilities(
        in DatInt::Facilities facilities
    );

void destroy();
    }; // TraceConfigList interface

// Startup logging configuration.
```

```
      struct LoggingConfig {
        boolean send_to_syslog;      // Send output to syslog daemon?
        boolean send_to_console;     // Send output to console (ie stderr)?
        DatInt::LogFile log_file;    // Send output to this file
      };

// Startup reaper configuration.  Each implmentation's reaper timeout
      // is set at startup from the corresponding Implementation
      // structure.
      struct ReaperConfig {
        // How many seconds to wait after the last object invocation
        DatInt::Seconds server_timeout;
        // How often to wake up the reaper thread and check timeouts
        DatInt::Seconds reaper_cycle_time;
        // Whether reaper should be started
        boolean reaping;
      };

//*****************************************************************
      //
      // InternalAdmin interface
      //
      // These are the methods that should only be called from within ODF.
      //
      //*****************************************************************
      interface InternalAdmin {
   void set_server_name(
        in string server_name
   );
   void set_version(
        in DatInt::Version version
   );
   void set_data_directory(
        in string data_directory
   );
   void set_computer_name(
        in string computer_name
   );
   void set_development_mode(
        in boolean in_development.
   );

//
   // Populate the interface/implementation sequences: called by
   // servers at registration time
   //
   exception InterfaceExists {};
   exception InterfaceNotFound {};
   exception ImplementationExists {};
   exception ImplementationNotFound {};

// Called at the start of the registration run
   void clear_interfaces();

Interface find_interface(
        in string interface_name
   ) raises(InterfaceNotFound);
```

35

```
    void add_interface(
        in Interface new_interface
    ) raises(InterfaceExists);

void clear_implementations();

Implementation find_implementation(
        in string interface_name,
        in string implementation_name
    ) raises(InterfaceNotFound, ImplementationNotFound);

void add_implementation(
        in Implementation implementation
    ) raises(ImplementationExists, InterfaceNotFound);

void set_spy(
        in DatInt::ServerSpy spy
    );
    }; // InternalAdmin interface //******************************************************************
//
// ServerAdmin interface
//
//****************************************************************** interface ServerAdmin: InternalAdmin, DatInt::ServerSpy {
//
// Attributes set at server registration time
//
// ODF servers automatically set this information.
    readonly attribute string server_name;        // Server name
    readonly attribute DatInt::Version version;   // Server version and date
    readonly attribute string data_directory;     // Persistence directory
    readonly attribute string computer_name;      // Where installed
    readonly attribute boolean in_development;    // Versus deployed readonly attribute Interfaces interfaces;
    readonly attribute Implementations implementations;
    readonly attribute ImplementedInterfaces implemented_interfaces;

//
// Inspect/change the current server state (also see the ServerSpy
// interface)
//

// Is the server currently running?
    readonly attribute boolean is_running;

// Process ID if running, zero otherwise
    readonly attribute DomfAdministration::pid_t process_id;

// Prevent or allow new requests from starting the server.
    // HoldDownDuration meanings:
```

```
//     LONG:  Future requests throw an exception
//     SHORT: Future requests wait for server to be released
//     NONE:  No hold is in effect
attribute BoaDbAdmin::HoldDownDuration hold_down;

// Program definition that controls how the domf daemon starts the
// server.
attribute BOA::Program boa_program_def;

// Saved version of server startup parameters in the BOA database.
attribute BOA::Program saved_program_def;

// Set the current BOA program definition to the saved definition.
void restore_saved_program();

// Interpose another program before the server.  Program_path will
// become the pathname, argv[1] becomes "-_orig_prog_path",
// argv[2] becomes the original path, and the rest of the arguments
// are appended.  When the domfd starts the server it puts its own
// arguments first, so the interposing program must search for the
// "-_orig_prog_path" switch to find the server program path.
const string interposed_arg_identifier = "-_orig_prog_path";
void interpose(
    in string alternate_program_path,
    in BoaDbAdmin::BoaDb::StringSeq additional_args
);

//
// Configurations read by servers at startup time
//
readonly attribute TraceConfigList trace_config_list;
attribute ReaperConfig reaper_config;
attribute LoggingConfig logging_config;

//
// Methods called by servers to notify ServerAdmin of state changes
//

// Called by servers when starting
oneway void starting(
    in DomfAdministration::pid_t pid,
    in DatInt::Seconds heartbeat_interval_seconds,
    in unsigned long missed_heartbeats_allowed
);

// Called by servers periodically
boolean sending_heartbeat();

// Called by servers when shutting down
oneway void stopping();

//
// Other methods
//

// The spy objref.  Any calls to this will start the server if it is
// not already running.
```

37

```
    readonly attribute DatInt::ServerSpy spy;

// Destroy the instance and free its persistent state.
    void destroy();

// This interface's version
    readonly attribute Version admin_interface_version;

}; // ServerAdmin interface

//******************************************************************
    //
    // ServerAdminFactory: Create a new ServerAdmin instance
    //
    //******************************************************************
       interface ServerAdminFactory {
    ServerAdmin create();
       };
};

#endif           // _SERVER_ADMIN_IDL
```

We claim:

1. A computer system for accessing and manipulating configuration information about a server program within the computer system, comprising:

at least one persistent server administrator object associated with the server program, and stored within the computer system and externally to the server program, and including:

a plurality of machine readable storage structures adapted to contain configuration information of the server program;

a plurality of machine executable structures adapted to access and manipulate the machine readable storage structures without starting up the server program as a server process in the computer system, the machine readable storage structures updated to include selected configuration information during registration of the server program.

2. The computer system of claim 1 further comprising:

at least one client object executing as a client process;

wherein the server administrator object is adapted to receive invocations of the machine executable structures from a client object, and in response to the invocations, to provide selected configuration information to the client object.

3. The computer system of claim 1 further comprising:

at least one client object executing as a client process; and a basic object adapter communicatively coupled between the client object and the server program and adapted to provide the client object access to objects within the server program, the basic object adapter further adapted to store execution configuration information of the server program to invoke the server program in response to a request from the client object;

wherein the server administrator object is adapted to receive invocations of the machine executable structures from a client object, and in response to the invocations, to update the execution configuration information of the server program stored in a basic object adapter.

4. The computer system of claim 1, further comprising:

a primary storage adapted to store the server process including objects and data; and a processing unit adapted to execute a server and object methods, each executed server or object method being a process in the primary storage.

5. The computer system of claim 4, wherein selected ones of the structures of the server administrator object further comprise:

a process identification structure adapted to determine a process identifier of the server program process by the processing unit without invoking the server program if the server program is not currently executing; and, a structure adapted to store the process identifier.

6. The computer system of claim 1, wherein selected ones of the structures of the server administrator object further comprise:

a name structure adapted to determine a name for the server program, and a structure adapted to store the name;

a host name structure adapted to determine a computer name of the host computer including the associated server program, and a structure adapted to store the computer name; and an execution definition structure adapted to determine an execution definition structure containing at least a current pathname for the server program, and a structure adapted to store the execution definition.

7. The computer system of claim 6, wherein the execution definition structure is further adapted to establish a current program definition including a current set of command line arguments and a current set of environment parameters to be used with the server program when the server program is executed, and is coupled to a structure adapted to store the current program definition.

8. The computer system of claim 7, wherein selected ones of the structures of the server administrator object further comprise:

a structure adapted to store a saved program definition for the server program, the saved program definition including a backup pathname of the server program, a backup set of command line arguments, and a backup set of environment parameters; and, a structure adapted to restore the current program definition with the saved program definition.

9. The computer system of claim 6, wherein the execution definition structure is further adapted to determine a pathname of a data directory associated with the server program.

10. The computer system of claim 1, wherein selected ones of the structures of the server administrator object further comprise:

a structure adapted to determine whether the server program associated with the server administrator is executing without invoking the server program if the server is not currently executing; and, a structure adapted to store a value indicative of whether the server program is executing.

11. The computer system of claim 1, wherein selected ones of the structures of the server administrator object further comprise:

a structure adapted to establish a hold down value in an execution definition of the server program used to invoke the server program; and, a structure adapted to store the hold down value.

12. The computer system of claim 1, wherein the machine executable structures of the server administrator object further comprise:

a structure adapted to interpose an executable application for the server program when the server program is invoked; and, a structure adapted to store a program definition for the executable application, including a pathname for the executable application, and a set of command line arguments.

13. The computer system of claim 1, wherein:

the server program further includes a machine executable deallocation structure adapted to automatically deallocate idle objects within the server program when the server is executing as a process, the machine executable deallocation structure operating according to selected ones of the machine readable storage structures in the server administrator object;

wherein the selected ones of the machine readable storage structures include:

a first attribute that enables or disables the machine executable deallocation structure;

a second attribute that establishes a cycle time for the machine executable deallocation structure; and, a third attribute that establishes an maximum time interval for which the server program can be idle, such that the server program is automatically shutdown by machine executable deallocation structure after a time interval equal to or exceeding the maximum time interval;

and wherein selected ones of the machine executable structures of the server administrator object establish selected ones of the first, second, and third attributes.

14. The computer system of claim 1, wherein:

the computer system includes a machine executable logging structure adapted to log information regarding the execution of the server program, the machine executable logging structure operating according to selected ones of the machine readable storage structures in the server administrator object;

wherein the selected ones of the machine readable storage structures include:

a first attribute that enables or disables logging by an operating system process; and a second attribute that identifies at least one log file used by the machine executable logging structure to store information, and that establishes a maximum file size for the log file;

and wherein selected ones of the machine executable structures of the server administrator object establish selected ones of the first, and second attributes.

15. The computer system of claim 1, wherein selected ones of the machine readable storage structures of the server administrator object further include:

a structure adapted to store an interval value indicative of a frequency for the server program to send a signal to the server administrator to indicate that the server program is currently executing; and, a structure adapted to store a maximum value indicative of a maximum number of signals that the server administrator may not receive prior to initiating a process to determine whether the server program is currently executing.

16. The computer system of claim 1, wherein:

the server program further includes at least one tracing facility;

the computer system further includes a machine executable tracing structure adapted to output conditional information according to at least one tracing facility in the server program; and selected ones of the machine executable structures of the server administrator object further comprise:

a structure adapted to define a tracing configuration including a tracing facility and a set of trace flags, and a structure adapted to store the tracing configuration; and, a structure adapted to update the tracing facilities in the server program with tracing facilities stored in the server administrator.

17. The computer system of claim 16, wherein selected ones of the machine executable structures include:

a structure that enables at least one trace flag in a specified tracing facility; and, a structure that disables at least one trace flag in a specified tracing facility.

18. The computer system of claim 1, wherein selected ones of the machine executable structures include:

a structure adapted to store an identification of each object interface provided by the server program; and, a structure adapted to store an identification of each object implementation in the server program that implements an object interface.

19. A method for determining and manipulating current configuration information for a server program on a host computer, the method comprising the steps of:

creating an instance of a persistent first object in the host computer;

associating the first object with the server program during installation of the server program, the first object having access to current configuration information of the server program;

receiving by the first object a request from a client for current configuration information about the server program;

executing the first object on the host computer without invoking the server program when the server program is not executing as a process on the host computer to obtain the current configuration information; and returning the current configuration information to the client.

20. The method of claim 19, further comprising the step of:

storing in the first object current configuration information upon registration of the server program; and updating selected stored current configuration information each time the server program is executed as a process on the host computer.

21. The method of claim 19, further comprising the steps of:

receiving by the first object a request from a client for current process information about the server program; and invoking from the first object a second object internal to the server program to obtain the process information.

22. The method of claim 19, wherein the first object is a server administrator object.

23. The method of claim 19, further comprising the steps of:

determining an execution definition for the server program; and, storing the execution definition in the first object.

24. The method of claim 23, wherein the execution definition includes a program definition, the method further comprising the steps of:

storing a saved program definition for the server program in the first object;

altering the execution definition to provide a new program definition, and, restoring the saved program definition into the execution definition.

25. The method of claim 23, further comprising the steps of:

storing a hold down value in the execution definition; and suppressing execution of the server program according to the hold down value when the server program is invoked by a client.

26. The method of claim 19, further comprising the steps of:

invoking a pseudo object to determine if the server program is currently executing;

returning a process identifier if the server program is executing; and, storing a value indicating that the server program is executing.

27. The method of claim 19, further comprising the steps of:

storing a program definition for an executable application in an execution definition of the server program in the first object; and interposing the executable application according to the program definition when the server program is invoked by a client.

28. The method of claim 19, further comprising the steps of:

storing in the first object an attribute for enabling or disabling a process for automatically deallocating idle objects within the server;

storing in the first object an attribute for establishing a cycle time for the process;

storing in the first object an attribute for establishing a maximum time interval for which the server program can be idle before the server program is shutdown by the process; and shutting down the server program when the maximum time interval is equaled or exceeded.

29. The method of claim 19, further comprising the steps of:

storing in the first object an attribute for enabling or disabling logging by an operating system process;

storing in the first object an attribute for identifying at least one log file for storing information; and, storing in the first object an attribute for establishing a maximum file size for the log file.

30. The method of claim 19, further comprising the steps of:

storing in the first object an interval value indicative of a frequency for the server program to send a signal to the first object to indicate that the server program is currently executing;

storing in the first object a maximum value indicative of a maximum number of signals that the first object may not receive prior to initiating a process to determine whether the server program is currently executing; and initiating a process from the first object to determine whether the server program is currently executing if the first object does not receive a number of signals equal to or exceeding the maximum number of signals.

31. The method of claim 19, further comprising the steps of:

determining a tracing configuration including at least one tracing facility and a set of trace flags in the server;

storing in the first object the tracing configuration; and periodically updating the tracing facilities in the server program with tracing facilities stored in the first object.

32. The method of claim 31, further comprising the step of:

selectively enabling at least one trace flag in a specified tracing facility in the first object.

33. The method of claim 19, further comprising the steps of:

storing in the first object an identification of each object interface provided by the server program; and, storing in the first object an identification of each object implementation in the server program that implements a object interface.

* * * * *